(12) United States Patent
Yaluris et al.

(10) Patent No.: US 7,906,015 B2
(45) Date of Patent: Mar. 15, 2011

(54) REDUCTION OF GAS PHASE REDUCED NITROGEN SPECIES IN PARTIAL BURN FCC PROCESSES

(75) Inventors: George Yaluris, Columbia, MD (US); John Allen Rudesill, Columbia, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 722 days.

(21) Appl. No.: 11/238,745

(22) Filed: Sep. 29, 2005

(65) Prior Publication Data

US 2006/0021910 A1    Feb. 2, 2006

Related U.S. Application Data

(63) Continuation-in-part of application No. 10/274,621, filed on Oct. 21, 2002, now abandoned.

(51) Int. Cl.
*C10G 11/00* (2006.01)

(52) U.S. Cl. ........ 208/113; 502/241; 502/242; 502/243; 502/244; 502/245; 502/247; 502/250; 502/251; 502/252; 502/262; 502/263; 502/302; 502/303; 502/304; 502/312; 502/314; 502/318; 502/326; 502/327

(58) Field of Classification Search ........... 208/113–121
See application file for complete search history.

(56) References Cited

U.S. PATENT DOCUMENTS

| 4,153,535 A | 5/1979 | Vasalos et al. ................. 208/120 |
| 4,199,435 A | 4/1980 | Chessmore et al. ........... 208/113 |
| 4,290,878 A | 9/1981 | Blanton, Jr. ................... 208/120 |
| 4,368,057 A | 1/1983 | Matthews ....................... 47/197 |
| 4,428,827 A | 1/1984 | Hobbs et al. ................... 208/120 |
| 4,434,147 A | 2/1984 | Dimpfl et al. ................. 423/235 |
| 4,437,147 A | 3/1984 | Takamura et al. ............... 363/61 |
| 4,469,589 A | 9/1984 | Yoo et al. ...................... 208/120 |

(Continued)

FOREIGN PATENT DOCUMENTS

WO    96/34685    11/1996

(Continued)

OTHER PUBLICATIONS

Yang, Wen-ching. (2003) Handbook of Fluidization and Fluid-particle Systems. CRC Press, 1868 pages.*

(Continued)

*Primary Examiner* — Walter D Griffin
*Assistant Examiner* — Brian McCaig
(74) *Attorney, Agent, or Firm* — Charles A. Cross; Beverly J. Artale

(57) ABSTRACT

Reduced emissions of gas phase reduced nitrogen species in the off gas of an FCC regenerator operated in a partial or incomplete mode of combustion is achieved by contacting the off gas with an oxidative catalyst/additive composition having the ability to reduce gas phase nitrogen species to molecular nitrogen and to oxidize CO under catalytic cracking conditions. The oxidative catalyst/additive composition is used in an amount less than the amount necessary to prevent afterburn. Fluidizable particles of the oxidative catalyst/additives are circulated throughout the partial or incomplete burn FCC unit along with the FCC catalyst inventory. The flue gas having a reduced content of gas phase reduced nitrogen species and $NO_x$ is passed to a downstream CO boiler, preferably a low $NO_x$ CO boiler. In the CO boiler, as CO is oxidized to $CO_2$, a reduced amount of gas phase reduced nitrogen species is oxidized to $NO_x$, thereby providing an increase in the overall reduction of $NO_x$ emitted into the environment.

37 Claims, 7 Drawing Sheets

U.S. PATENT DOCUMENTS

| | | | | |
|---|---|---|---|---|
| 4,471,070 | A | 9/1984 | Siefert et al. | 502/302 |
| 4,472,267 | A | 9/1984 | Yoo et al. | 208/120 |
| 4,472,532 | A | 9/1984 | Mooi | 502/302 |
| 4,476,245 | A | 10/1984 | Siefert | 502/302 |
| 4,492,677 | A | 1/1985 | Yoo et al. | 423/244 |
| 4,492,678 | A | 1/1985 | Yoo et al. | 423/244 |
| 4,495,304 | A | 1/1985 | Yoo et al. | 502/66 |
| 4,495,305 | A | 1/1985 | Yoo et al. | 502/65 |
| 4,522,937 | A | 6/1985 | Yoo et al. | 502/302 |
| 4,529,502 | A | 7/1985 | Wang | 208/164 |
| 4,529,574 | A | 7/1985 | Wang | 423/244 |
| 4,613,428 | A | 9/1986 | Edison | 208/113 |
| 4,626,419 | A | 12/1986 | Lewis et al. | 423/244 |
| 4,642,178 | A | 2/1987 | Yoo et al. | 208/113 |
| 4,728,635 | A | 3/1988 | Bhattacharyya | 502/304 |
| 4,744,962 | A | 5/1988 | Johnson et al. | 423/235 |
| 4,755,282 | A | 7/1988 | Samish et al. | 208/113 |
| 4,758,418 | A | 7/1988 | Yoo et al. | 423/244 |
| 4,778,665 | A | 10/1988 | Krishnamurthy et al. | 423/239 |
| 4,790,982 | A | 12/1988 | Yoo et al. | 423/239 |
| 4,812,430 | A | 3/1989 | Child | 502/42 |
| 4,812,431 | A | 3/1989 | Child | 502/42 |
| 4,830,840 | A | 5/1989 | Bhattacharyya | 423/239 |
| 4,851,374 | A | 7/1989 | Yan et al. | 502/42 |
| 4,883,783 | A | 11/1989 | Burk et al. | 502/304 |
| 4,904,627 | A | 2/1990 | Bhattacharyya | 502/304 |
| 4,957,718 | A | 9/1990 | Yoo et al. | 423/244 |
| 4,957,892 | A | 9/1990 | Yoo et al. | 502/63 |
| 4,963,520 | A | 10/1990 | Yoo et al. | 502/64 |
| 4,973,399 | A | 11/1990 | Green et al. | 208/120 |
| 4,980,052 | A | 12/1990 | Green et al. | 208/120 |
| 5,002,654 | A | 3/1991 | Chin | 208/121 |
| 5,011,592 | A | 4/1991 | Owen et al. | 208/113 |
| 5,021,144 | A | 6/1991 | Altrichter | 208/113 |
| 5,037,538 | A | 8/1991 | Chin et al. | 208/113 |
| 5,057,205 | A | 10/1991 | Chin et al. | 208/121 |
| 5,077,252 | A | 12/1991 | Owen et al. | 502/43 |
| 5,173,278 | A | 12/1992 | Marler | 423/239 |
| 5,240,690 | A | 8/1993 | Tang | 423/236 |
| 5,242,881 | A | 9/1993 | Tang | 502/244 |
| 5,268,089 | A | 12/1993 | Avidan et al. | 208/113 |
| 5,364,517 | A | 11/1994 | Dieckmann et al. | 208/121 |
| 5,372,706 | A * | 12/1994 | Buchanan et al. | 208/113 |
| 5,382,352 | A | 1/1995 | Hansen et al. | 208/121 |
| 5,443,807 | A | 8/1995 | Tang | 423/247 |
| 5,547,648 | A | 8/1996 | Buchanan et al. | 423/210 |
| 5,565,181 | A | 10/1996 | Dieckmann et al. | 423/239.1 |
| 5,565,399 | A * | 10/1996 | Fraenkel et al. | 502/304 |
| 5,705,053 | A | 1/1998 | Buchanan | 208/113 |
| 5,716,514 | A | 2/1998 | Buchanan | 208/113 |
| 5,830,346 | A | 11/1998 | Harandi et al. | 208/113 |
| 5,908,804 | A | 6/1999 | Menon et al. | 502/38 |
| 6,129,834 | A | 10/2000 | Peters et al. | 208/120.01 |
| 6,143,167 | A | 11/2000 | Peters et al. | 208/113 |
| 6,165,933 | A * | 12/2000 | Peters et al. | 502/330 |
| 6,280,607 | B1 | 8/2001 | Peters et al. | 208/120.01 |
| 6,358,881 | B1 | 3/2002 | Peters et al. | 502/304 |
| 6,379,536 | B1 | 4/2002 | Peters et al. | 208/120.01 |
| 6,660,683 | B1 | 12/2003 | Yaluris et al. | 502/241 |
| 2004/0086442 | A1 | 5/2004 | Vierheilig | 423/239.1 |

FOREIGN PATENT DOCUMENTS

WO 97/48480 12/1997

OTHER PUBLICATIONS

Meyers, Robert A. (2004) Handbook of Petroleum Refining Processes. McGraw-Hill, 900 pages.*

Zhao, X. et al. (1997). Ind. Eng. Chem. Res., 36, 4535-4542.*

J.S. Magee and M.M. Mitchell, Jr. Eds. Studies in Surface Science and Catalysis vol. 76, Ch 8, pp. 257-292, Elsevier Science Pulbishers B.V., Amsterdam 1993, ISBN 0-444-89037-8 ; G.W. Young, "Realistic Assessment of FCC Catalyst Performance in the Laboratory," in Fluid Catalytic Cracking: Science and Technology.

Corma, et al., "Simultaneous Catalytic Removal of Sox and Nox with Hydrotalcite-Derived Mixed Oxides Containing Copper, and Their Possibilities to be Used in FCC Units," Journal of Catalysis, 170, 140 (1997).

Venuto and Habib, "Fluid Catalytic Cracking with Zeolite Catalysts," Marcel Dekker, New York 1979, ISBN 0:8247-6870-1.

Sadeghbeigi, Fluid Catalytic Cracking Handbook, Gulf Publishing Company, Houston, 1995, ISBN 0-88415-290-1.

Scherzer, Octane Enhancing Zeolite FCC Catalysts, Marcel Dekker, Inc., New York, 1990, ISBN 08274-8399-9.

"The John Zink Combustion Handbook," editor, Charles E. Baulkal, Jr., published by CRC Press, 2001.

G. Yaluris and A.W. Peters "Studying the Chemistry of the FCCU Regenerator in the Laboratory Under Realistic Conditions," Designing Transportation Fuels for a Cleaner Environment, J.G. Reynolds and M.R. Khan, eds., p. 151, Taylor & Francis, 1999, ISBN: 1-56032-813-4.

"The John Zink Combustion Handbook," editor, Charles E. Baulkal, Jr., published by CRC Press, 2001.

* cited by examiner

REDUCTION OF GAS PHASE REDUCED NITROGEN SPECIES IN PARTIAL BURN FCC PROCESSES

CROSS-REFERENCE TO RELATED APPLICATIONS

This application is a continuation in part application of U.S. patent application Ser. No. 10/274,621, filed Oct. 21, 2002, abandoned on Jul. 25, 2006.

FIELD OF THE INVENTION

The present invention relates to a process for the reduction of $NO_x$ emissions in refinery processes, and specifically in a fluid catalytic cracking (FCC) process. Particularly, the present invention relates to a process for the reduction of gas phase reduced nitrogen species (e.g. $NH_3$, HCN) in the off gas from a fluid catalytic cracking unit (FCCU) regenerator operating in a partial or incomplete combustion mode.

BACKGROUND OF THE INVENTION

In recent years there has been an increased concern in the United States and elsewhere about air pollution from industrial emissions of noxious oxides of nitrogen, sulfur and carbon. In response to such concerns, government agencies have in some cases already placed limits on allowable emissions of one or more of the pollutants, and the trend is clearly in the direction of increasingly stringent restrictions.

$NO_x$, or oxides of nitrogen, in flue gas streams exiting from fluid catalytic cracking (FCC) regenerators is a pervasive problem. Fluid catalytic cracking units (FCCU) process heavy hydrocarbon feeds containing nitrogen compounds a portion of which is contained in the coke on the catalyst as it enters the regenerator. Some of this coke nitrogen is eventually converted into $NO_x$ emissions, either in the FCC regenerator or in a downstream CO boiler. Thus all FCCUs processing nitrogen-containing feeds can have a $NO_x$ emissions problem due to catalyst regeneration.

In an FCC process, catalyst particles (inventory) are repeatedly circulated between a catalytic cracking zone and a catalyst regeneration zone. During regeneration, coke deposited from the cracking reaction on the catalyst particles is removed at elevated temperatures by oxidation with oxygen containing gases such as air. The removal of coke deposits restores the activity of the catalyst particles to the point where they can be reused in the cracking reaction. The coke removal step is performed over a wide range of oxygen availability conditions. At the minimum, there is typically at least enough oxygen to convert all the coke made to CO and $H_2O$. At the maximum, the amount of oxygen available is equal to or greater than the amount necessary to oxidize all the coke to $CO_2$ and $H_2O$.

In an FCC unit operating with sufficient air to convert essentially all of the coke on the catalyst to $CO_2$ and $H_2O$, the gas effluent exiting the regenerator will contain "excess oxygen" (typically 0.5 to 4% of total off gas). This combustion mode of operation is usually called "full burn". When the fluid catalytic cracking unit (FCCU) regenerator is operating in full burn mode, the conditions in the regenerator are for the most part oxidizing. That is, there is at least enough oxygen to convert (burn) all reducing gas phase species (e.g., CO, ammonia, HCN) regardless of whether this actually happens during the residence time of these species in the regenerator. Under these conditions, essentially all of the nitrogen deposited with coke on the catalyst during the cracking process in the FCCU riser is eventually converted to molecular nitrogen or $NO_x$ and exits the regenerator as such with the off gas. The amount of coke nitrogen converted to $NO_x$ as opposed to molecular nitrogen depends on the design, conditions and operation of the FCCU and especially of the regenerator, but typically the majority of coke nitrogen exits the regenerator as molecular nitrogen.

On the other hand, when the amount of air added to the FCCU regenerator is insufficient to fully oxidize the coke on the cracking catalyst to $CO_2$ and $H_2O$, some of the coke remains on the catalyst, while a significant portion of the coke carbon burned is oxidized only to CO. In FCCUs operating in this fashion, oxygen may or may not be present in the regenerator off gas. However, should any oxygen be present in the regenerator off gas, it is typically not enough to convert all of the CO in a gas stream to $CO_2$ according to the chemical stoichiometry of $$CO + \tfrac{1}{2}O_2 \rightarrow CO_2$$

This mode of operation is usually called "partial burn." When an FCCU regenerator is operating in partial burn mode, the CO produced, a known pollutant, cannot be discharged untreated to the atmosphere. To remove the CO from the regenerator off gas and realize the benefits of recovering the heat associated with burning it, refiners typically burn the CO in the regenerator off gas with the assistance of added fuel and air in a burner usually referred to as "the CO boiler". The heat recovered by burning the CO is used to generate steam.

When the regenerator is operating in partial burn, the conditions in the regenerator, where the oxygen added with air has been depleted and CO concentration has built up, are overall reducing. That is, there is not enough oxygen to convert/burn all reducing species regardless if some oxygen is actually still present. Under these conditions some of the coke-nitrogen is converted to so called "gas phase reduced nitrogen species", examples of which are ammonia and HCN. $NO_x$ may sometimes also be present in the partial burn regenerator off gas, but typically only in small amounts. When these gas phase reduced nitrogen species are burnt in the CO boiler with the rest of the regenerator off gas, they can be oxidized to $NO_x$, which is then emitted to the atmosphere. This $NO_x$ along with any "thermal" $NO_x$ formed in the CO boiler burner by oxidizing atmospheric $N_2$ constitute the total $NO_x$ emissions of the FCCU unit operating in a partial or incomplete combustion mode.

FCCU regenerators may also be designed and operated in a "incomplete burn" mode intermediate between full burn and partial burn modes. An example of such an intermediate regime occurs when enough CO is generated in the FCCU regenerator to require the use of a CO boiler, but because the amounts of air added are large enough to bring the unit close to full burn operation mode, significant amounts of oxygen can be found in the off gas and large sections of the regenerator are actually operating under oxidizing conditions. In such case, while gas phase reduced nitrogen species can still be found in the off gas, significant amounts of $NO_x$ are also present. In most cases a majority of this $NO_x$ is not converted in the CO boiler and ends up being emitted to the atmosphere.

Yet another combustion mode of operating an FCCU is nominally in full burn with relatively low amounts of excess oxygen and/or inefficient mixing of air with coked catalyst. In this case, large sections of the regenerator may be under reducing conditions even if the overall regenerator is nominally oxidizing. Under these conditions reduced nitrogen species may be found in the regenerator off gas along with $NO_x$.

Simultaneously with $NO_x$ emissions, afterburn may also be a concern for units operating in partial burn or incomplete combustion mode. Gases exiting the catalyst bed of an FCCU operating in partial burn combustion mode will consist mainly of $CO_2$, CO, $H_2O$, reduced nitrogen gases, other reduced species such as $H_2S$ and COS, $SO_2$, and potentially some $O_2$ and/or NO. However, depending on the design and mechanical condition of the regenerator, conditions can develop in which sufficient amounts of CO and $O_2$ escape the catalyst bed allowing the CO to react with the available $O_2$. The reaction can occur in the regenerator at any point above the dense catalyst bed, including the area above the dense bed (dilute phase), the cyclones where entrained catalyst is separated from the flue gas, the plenum above the cyclones, or even the flue gas pipe. Because afterburn occurs after the dense bed of the cracking catalyst, which acts as a heat sink absorbing the heat released from the exothermic reaction of CO with $O_2$, it can heat up the gases to the point that overheating can occur. The result can be temperatures which approach the metallurgical limit of the materials used to construct the regenerator. High afterburn can limit the useful life of the regenerator equipment, and runaway afterburn can cause catastrophic equipment failure.

Typically, afterburn is prevented or controlled by adding CO combustion promoters to the cracking catalyst circulating inventory which promote the combustion of CO to $CO_2$. Conventional CO combustion promoters typically comprise an additive comprising 300 to 1000 ppm platinum or alumina, or a much smaller amount of platinum, e.g., amounts which typically achieve from about 0.1 to about 10 ppm in the total cracking catalyst inventory, incorporated directly into the cracking catalyst itself.

While CO combustion promoters can be effectively used to prevent or control afterburn in FCC units operated in partial burn or incomplete combustion mode, the use of combustion promoters is not desirable in many FCC units. By promoting the reaction of CO to $CO_2$ in an oxygen deficient environment, a combustion promoter can consume oxygen to convert CO, oxygen which otherwise would have been used to convert coke to CO, thereby increasing coke left on the regenerated catalyst (CRC). Increased amounts of CRC on the cracking catalyst returned to the riser will decrease the catalyst activity, and may reduce conversion and product yields. Any increase in the conversion of CO will also increase the heat released in the regenerator and as a result can raise the temperature in the dense catalyst bed. Increasing the dense bed temperature can often be undesirable, since higher regenerated catalyst temperature can negatively affect catalyst circulation, catalyst activity and stability, unit conversion and/or product yields. Thus, many FCC units operated in partial burn or incomplete combustion mode, can not use any CO combustion promoter or any other additive having CO oxidation activity sufficient to be useful as a CO oxidation promoter under catalytic cracking conditions.

Various catalytic approaches have been proposed to control $NO_x$ emissions in the flue gas exiting from the FCCU regenerator.

For example, recent patents, including U.S. Pat. Nos. 6,379,536, 6,280,607, 6,129,834 and 6,143,167, have proposed the use of $NO_x$ removal compositions for reducing $NO_x$ emissions from an FCCU regenerator. U.S. Pat. Nos. 6,358,881 and 6,165,933 also disclose a $NO_x$ reduction composition which promotes CO combustion during an FCC catalyst regeneration process step while simultaneously reducing the level of $NO_x$ emitted during the regeneration step. $NO_x$ compositions disclosed by these patents may be used as an additive, which is circulated along with the FCC catalyst inventory or incorporated as an integral part of the FCC catalyst.

In U.S. Pat. No. 4,290,878, $NO_x$, is controlled in the presence of platinum-promoted CO oxidative promoters in a full burn combustion regenerator by the addition of iridium or rhodium on the combustion promoter in amounts lesser than the amount of Pt.

U.S. Pat. Nos. 4,973,399 and 4,980,052 disclose copper-loaded zeolite additives useful for reducing emissions of $NO_x$ from the regenerator of an FCCU unit operating in full burn combustion mode.

U.S. Pat. No. 4,368,057, teaches the removal of $NH_3$ contaminants of gaseous fuel by reacting the $NH_3$ with a sufficient amount of $NO_x$.

However, aforementioned prior art has failed to appreciate an FCC process which minimizes the amount of gas phase reduced nitrogen species, e.g. $NH_3$ and HCN, in the flue gas of an FCCU regenerator operating in a partial or incomplete combustion mode.

Efforts to control ammonia released in an FCC regenerator operated in a partial or an incomplete mode of combustion have been known.

For example, U.S. Pat. No. 5,021,144 discloses reducing ammonia in an FCC regenerator operating in a partial burn combustion mode by adding a significant excess of the amount of a carbon monoxide (CO) combustion promoter sufficient to prevent afterburn in the dilute phase of the regenerator.

U.S. Pat. No. 4,755,282 discloses a process for reducing the content of ammonia in a regeneration zone off gas of an FCCU regenerator operating in a partial or incomplete combustion mode. The process requires passing a fine sized, i.e. 10 to 40 microns, ammonia decomposition catalyst to either the regeneration zone of an FCCU, or an admixture with the off gas from the regeneration zone of the FCCU, at a predetermined make-up rate such that the residence time of the decomposition catalyst relative to the larger FCC catalyst particles will be short in the dense bed of the regenerator due to rapid elutriation of the fine sized ammonia decomposition catalyst particles. The fine sized elutriated decomposition catalyst particles are captured by a third stage cyclone separator and recycled to the regenerator of the FCCU. The decomposition catalyst may be a noble group metal dispersed on an inorganic support.

U.S. Pat. No. 4,744,962 is illustrative of a post-treatment process to reduce ammonia in the FCCU regenerator flue gas. The post-treatment involves treating the regenerator flue gas to lessen the ammonia content after the gas has exited the FCCU regenerator but before passage to the CO boiler.

There remains a need in the refining industry for improved FCC processes which minimizes the content of gas phase reduced nitrogen species and $NO_x$ emitted from a partial or incomplete combustion FCCU regenerator which processes are simple and do not require additional equipment, time and expense typically associated with prior FCC processes for the removal of the gas phase reduced nitrogen species in the regenerator off gas.

SUMMARY OF THE INVENTION

A catalytic cracking process has been developed which reduces the content of gas phase reduced nitrogen species, e.g. $NH_3$ and HCN, in the flue gas released from a partial or incomplete burn regeneration zone of the catalytic cracking unit prior to exiting the regenerator and before passage to a CO boiler. Advantageously, the process of the invention converts gas phase reduced nitrogen species to molecular nitrogen during the catalytic cracking process in the presence of CO and other reductants and oxidizers typically found in the regeneration zone operated in partial burn, thereby preventing the conversion of the reduced nitrogen species to $NO_x$ in the CO boiler.

Despite the reducing environment in an FCCU regenerator operated in a partial burn or incomplete burn mode, some $NO_x$ may form in the regenerator. In addition to controlling the content of gas phase reduced nitrogen species, the process of the invention also enhances the reduction of any $NO_x$ formed in the partial or incomplete burn regenerator during an FCC process. Particulate compositions used in the invention process catalyze the reaction of $NO_x$ with reductants typically found in the FCCU regenerator, e.g. CO, hydrocarbons and gas phase reduced nitrogen species, to form molecular nitrogen. Advantageously, the process of the invention provides a reduction in $NO_x$ in the regenerator prior to the $NO_x$ exiting the regenerator and being passed through the CO boiler and into the environment.

The process of the invention comprises providing a circulating inventory of cracking catalyst in a catalytic cracking vessel having a regeneration zone operated in a partial or incomplete combustion mode, with an oxidative catalyst/additive composition having the ability to oxidize gas phase reduced nitrogen species emissions to molecular nitrogen under catalytic cracking conditions, and circulating the oxidative catalyst/additive composition throughout the cracking vessel simultaneously with the cracking catalyst inventory during the catalytic cracking process.

In a preferred embodiment of the invention, the process is a fluid catalytic cracking (FCC) process wherein the fluid catalytic cracking unit (FCCU) regenerator is operated in a partial or incomplete combustion mode. In accordance with the process of the invention, the oxidative catalyst/additive is circulated throughout the FCCU along with the FCC catalyst inventory in a manner such that the residence time of the catalyst/additive composition in the FCCU regenerator relative to the residence time of the FCC cracking catalyst is the same or substantially the same.

Advantageously, the process of the invention provides for a decrease in the content of gas phase reduced nitrogen species in the flue gas released from an FCCU regenerator operating in a partial or incomplete burn mode. The flue gas having the reduced content of reduced nitrogen species is passed to a CO boiler. In the CO boiler, as CO is oxidized to $CO_2$, a lower amount of the gas phase reduced nitrogen species is oxidized to $NO_x$, thereby providing an increase in the overall reduction of $NO_x$ emissions from the FCCU.

Accordingly, it is an advantage of this invention to provide a process for reducing the content of gas phase reduced nitrogen species, e.g. $NH_3$ and HCN, in the flue gas exiting an FCC unit regenerator operating under a partial or incomplete mode of combustion.

It is another advantage of this invention to provide a process for the reduction of $NO_x$ in the off gas of a partial or incomplete combustion FCCU regenerator by diminishment and control of gas phase reduced nitrogen species being emitted with the regenerator zone effluent.

It is yet another advantage of this invention to provide a process for the reduction of the content of gas phase reduced nitrogen species, e.g. $NH_3$ and HCN, in an FCCU regenerator operating in partial or incomplete combustion mode utilizing a particulate oxidative catalyst/additive having a particle size sufficient to permit the catalyst/additive to be circulated throughout the FCCU simultaneously with the FCC catalyst inventory.

Another advantage of this invention is to provide a process for reducing the gas phase reduced nitrogen species, e.g. $NH_3$ and HCN, in the off gas of a partial or incomplete combustion FCCU regenerator wherein the gas phase reduced nitrogen species is reduced to molecular nitrogen thereby preventing their conversion to $NO_x$.

It is yet another advantage of this invention to provide a process for the reduction of gas phase reduced nitrogen species in an effluent stream passed from an FCC regenerator to a CO boiler, whereby as CO is oxidized to $CO_2$, a lesser amount of the reduced nitrogen species is oxidized to $NO_x$.

Another advantage of this invention is to provide improved FCC processes characterized by a reduction of gas phase reduced nitrogen species in the effluent gas stream passed from the FCC regenerator to a CO boiler, which process eliminates the need and expense of additional processing equipment and steps hereto proposed in the post-treatment of the regenerator flue gas after exiting the FCCU regenerator.

Another advantage of this invention is to provide improved FCC processes characterized by a reduction in the overall $NO_x$ emissions due to the reduction of gas phase reduced nitrogen species in the effluent gas stream passed from the FCC regenerator to a CO boiler.

Yet, another advantage of the present invention is to provide improved FCC processes characterized by a reduction in the overall $NO_x$ emissions due to the use of additives for reduction of gas phase reduced nitrogen species in the effluent gas stream passed from the FCC regenerator to a CO boiler, in combination with a "low $NO_x$" CO boiler (that is one designed for low thermal $NO_x$ generation), thereby resulting in even lower overall $NO_x$ emissions than achievable with the use of the additive alone.

Another advantage of this invention is to provide improved FCC processes characterized by a reduction in the overall $NO_x$ emissions from an FCCU regenerator operating in partial or incomplete combustion modes by catalyzing the reaction of $NO_x$ with CO and other reductants typically present in a partial or incomplete burn FCCU regenerator.

These and other aspects of the present invention are described in further detail below.

DETAILED DESCRIPTION OF THE INVENTION

Figure 1:
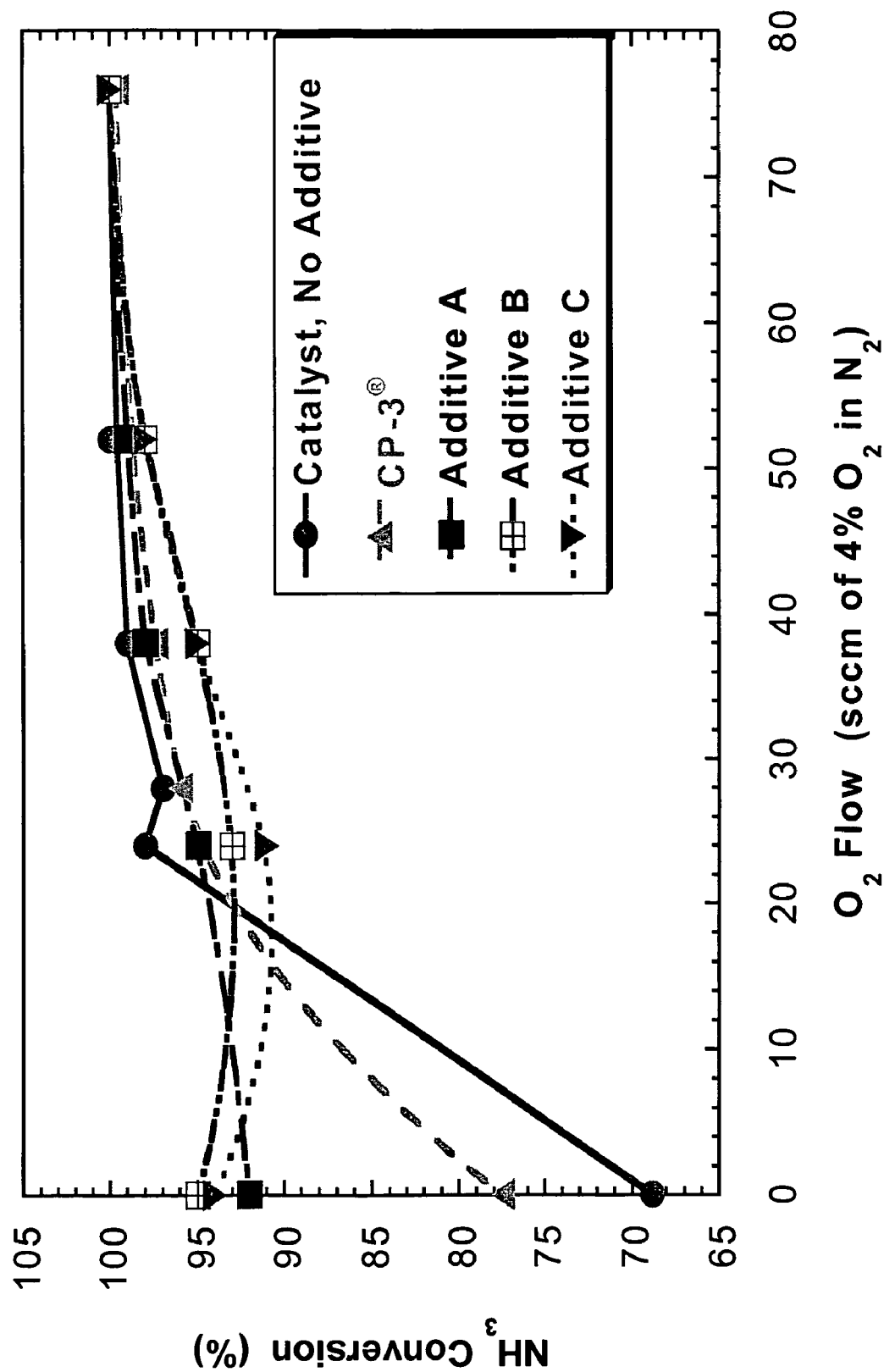
FIG. 1 is a graphic representation of the comparison of ammonia conversion reduction in an RTU where ammonia reacts with CO at various levels of oxygen in a reactor feed in the presence of Additives A, B and C, the FCC catalyst alone, and a commercial combustion promoter, CP-3®.

For purposes of this invention the term "$NO_x$" will be used herein to represent oxides of nitrogen, e.g. nitric oxide, (NO) and nitrogen dioxide ($NO_2$) the principal noxious oxides of nitrogen, as well as $N_2O_4$, $N_2O_5$, and mixtures thereof.

The term reduced "gas phase reduced nitrogen species" is used herein to indicate any gas phase species formed in the regenerator of a fluid catalytic cracking unit during a fluid catalytic cracking process which gas species contain a nitrogen having a nominal charge of less than zero. Examples of gas phase reduced nitrogen species include, but are not limited to, ammonia ($NH_3$), hydrogen cyanide (HCN), and the like.

For purposes of this invention the term "afterburn" is used herein to indicate the burning of CO which occurs when CO and $O_2$ escaping the dense bed of fluidized cracking catalyst being regenerated react at any point above the dense catalyst bed, including the area immediately above the dense bed (dilute phase), the cyclones where entrained catalyst is separated from the flue gas, the plenum, overhead area above the cyclones, or the flue gas pipe. Afterburn is measured as the difference between any of the temperatures measured after the regenerator dense bed, or the average of all or any group of such temperatures measured (e.g., dilute phase, cyclone, plenum, overhead, or flue gas temperatures and the like) minus any of the dense bed temperatures or the average of all or any group of dense bed temperatures measured.

In accordance with the process of the invention, the content of $NO_x$ emitted during an FCC process operating in a partial or incomplete combustion mode is effectively brought to a lower and more acceptable level by reducing the amount of gas phase reduced nitrogen species present in the flue gas of the FCCU regenerator prior to passage of the gas to the CO boiler, where as CO is oxidized to $CO_2$ a lesser amount of the reduced nitrogen species, e.g. $NH_3$ and HCN, is oxidized to $NO_x$ and emitted into the atmosphere. The reduction of the gas phase reduced nitrogen species is accomplished by contacting the circulating cracking catalyst inventory with an amount of an oxidative catalyst/additive sufficient to reduce the content of the reduced nitrogen species in the regenerator off gas while the additive is circulated throughout the FCCU simultaneously with the circulating catalyst inventory.

While the mechanism by which the process of the invention works to remove or minimize gas phase reduced nitrogen species is not precisely understood, it is believed that the process proceeds via two distinct mechanisms, either of which results in the conversion of reduced nitrogen species to molecular nitrogen. In one of the mechanisms, the gas phase reduced nitrogen species is partially oxidized to molecular $N_2$, according to a reaction that for $NH_3$ is:

$$2NH_3 + 3/2O_2 \rightarrow N_2 + 3H_2O$$

Alternatively, the gas phase reduced nitrogen species can be oxidized to a nitrogen oxide, most likely NO. The catalyst/additive then catalyzes the reduction of the resulting nitrogen oxide by reacting it with one of the reductants present in the regenerator, e.g. CO or unconverted ammonia. Additionally, the resultant $NO_x$ can be reduced by reacting with the coke on the cracking catalyst being regenerated. For the gas phase reduced nitrogen species $NH_3$, this mechanism proceeds according to the following reaction scheme:

$$2NH_3 + 5/2O_2 \rightarrow 2NO + 3H_2O$$

$$2NO + CO \rightarrow N_2 + CO_2$$

$$2NO + 2C \rightarrow N_2 + 2CO$$

$$2NO + C \rightarrow 2N_2 + CO_2$$

$$2NH_3 + 3NO \rightarrow 5/2N_2 + 3H_2O$$

The invention process involves circulating an inventory of cracking catalyst and the gas phase reduced nitrogen species oxidative catalyst/additive in a catalytic cracking process, which presently is almost invariably the FCC process. For convenience, the invention will be described with reference to the FCC process although the present cracking process could be used in the older moving bed type (TCC) cracking process with appropriate adjustments in particle size to suit the requirements of the process. Apart from the addition of the oxidative catalyst/additive composition to the catalyst inventory and some possible changes in the product yields, the manner of operating the process will remain unchanged. Thus, conventional FCC catalysts may be used, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type acidic zeolitic active component, one or more matrix aluminas and/or silica aluminas, and fillers such as kaolin clay. The Y zeolite may be present in one or more forms and may have been ultra-stabilized and/or treated with stabilizing cations such as any of the rare earths.

Somewhat briefly, the fluid catalytic cracking process in which a heavy hydrocarbon feedstock will be cracked to lighter products takes place by contact of the feed in a cyclic catalyst recirculation cracking process with a circulating fluidizable catalytic cracking catalyst inventory consisting of particles having a mean particle size of from about 50 to about 150 μm, preferably about 60 to about 100 μm. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Suitable feedstocks include petroleum distillates or residuals of crude oils which, when catalytically cracked, provide either a gasoline or a gas oil product. Synthetic feeds having boiling points of about 204° C. to about 816° C., such as oil from coal, tar sands or shale oil, can also be included.

Cracking conditions employed during the conversion of higher molecular weight hydrocarbons to lower molecular weight hydrocarbons include a temperature of 480 to about 600° C. A catalyst to hydrocarbon weight ratio of about 1 to 100, preferably about 3 to 20 is contemplated for the hydrocarbons conversion. The average amount of coke deposited on the surface of the catalyst is between 0.5 weight percent and 3.0 weight percent depending on of the quality of the feed, the catalyst used, and the unit design and operation. Rapid disengagement of the hydrocarbons from the catalyst is accomplished in a quick-stripping zone either intrinsic within the reactor or located in an external vessel. This stripping function is performed in the presence of steam or another inert gas at a temperature of about 480° C. to about 600° C.

The catalyst regeneration zone of the FCC process includes a lower dense bed of catalyst having a temperature of about 600° C. to about 800° C. and a surmounted dilute phase of catalyst having a temperature of from 600° C. to about 800° C. As it is well known in the art, the catalyst regeneration zone may consist of a single or multiple reactor vessels. In order to remove coke from the catalyst, oxygen is added to the regeneration zone. This is performed by conventional means, such as for example, using a suitable sparging device in the bottom of the regeneration zone or, if desired, additional oxygen is added to other sections of the dense bed or the dilute phase of the regeneration zone.

In the present invention it is preferable to provide an under-stoichiometric quantity of oxygen to operate the regeneration zone in a partial or incomplete combustion mode. For the purposes of this invention, the regeneration zone is operated in a partial or incomplete combustion mode, when any one the following conditions is satisfied: (1) there is not sufficient air or oxygen added to the regenerator to convert all the carbon in the coke on the spent cracking catalyst to $CO_2$; (2) the effluent from the regenerator does not contain enough oxygen to convert all CO in the regenerator effluent to $CO_2$; and/or (3) sufficient amount of CO is present in the regenerator effluent to require the use of a CO boiler to treat the regenerator effluent and convert the CO contained in the effluent to $CO_2$ before having said FCCU regenerator effluent discharged to the atmosphere.

Downstream of the regeneration zone, the solid catalyst and oxidative catalyst/additive particles and spent regeneration gas, comprising a small quantity of oxygen, as well as carbon monoxide plus carbon dioxide, water, and nitrogen oxides, and gas phase reduced nitrogen species are passed to a separation means. Preferably, the separation means comprises a series of cyclone separators wherein the particles will drop out of the bottom of the cyclone separators while the regeneration gas will be discharged in the overhead of the cyclone separator. After the regeneration off gas has been sufficiently separated from the solid particles in the separation means, the gas is passed to a CO boiler where added oxygen is provided to oxidize CO to $CO_2$. The CO boiler or combustion zone is typically operated with auxiliary fuel in order to insure complete conversion of CO to carbon dioxide. Either upstream or downstream of the CO boiler, an electrostatic precipitator may be utilized to remove dust particles which are entrained in the regeneration off gas. A scrubber may also be used to reduce both particulates and $SO_X$ emissions from the unit.

The oxidative catalyst/additives useful in the process of the invention may be any fluidizable material having the activity to oxidize gas phase reduced nitrogen species present in the off gas emitted from the regenerator zone of an FCCU operated in partial or incomplete combustion mode to molecular nitrogen under catalytic cracking conditions as the catalyst/additive is being circulated throughout the cracking unit along with the inventory of cracking catalyst. Typically, the catalyst/additives comprise a porous, amorphous or crystalline, refractory support material, e.g. an acidic metal oxide, a spinel, a hydrotalcite, a perovskite or the like, promoted with at least one metal component. Suitable metal promoters include, but are not limited, to alkali and/or alkaline earth metals, transition metals (e.g. metals from Groups IVA, VA, VIA, VIIA, VIIIA, IB of the Periodic Table and mixtures thereof), rare earth metals, Platinum group metals, metals from Group IIB of the Periodic Table, germanium, tin, bismuth, antimony and mixtures thereof. Platinum group metals are particularly preferred. Also preferred are transition metals and rare earth metals having oxygen storage capacity. The metal promoters are used in amounts sufficient to promote, under catalytic cracking conditions, ammonia oxidation and $NO_x$ reduction via the reaction of NOx with gas phase reductants, such as CO, hydrocarbons and the like, typically found in the regenerator of an FCCU operated at partial or incomplete burn.

One class of materials suitable for use as oxidative catalyst/additives in the process of the invention include compositions disclosed and described in U.S. Pat. No. 6,660,683, said application being herein incorporated in its entirety by reference. Oxidative catalyst/additive compositions in this class will typically comprise a particulate mixture of (a) an acidic metal oxide containing substantially no zeolite (preferably containing silica and alumina, most preferably containing at least 50 wt % alumina); (b) an alkali metal (at least 0.5 wt %, preferably about 1 to about 20 wt %), an alkaline earth metal (at least 0.5 wt %, preferably about 0.5 to about 60 wt %) and mixtures thereof; (c) at least 0.1 wt % of a rare earth or transition metal oxygen storage metal oxide component (preferably ceria); and (d) at least 0.1 ppm of a noble metal component (preferably Pt, Pd, Rh, Ir, Os, Ru, Re and mixtures thereof). All percentages based on the total weight of the oxidative catalyst/additive composition.

A second class of materials useful as oxidative catalyst/additives in the process of the invention include low $NO_X$, CO combustion promoter as disclosed and described in U.S. Pat. Nos. 6,165,933 and 6,358,881, the entire disclosure of these patents being herein incorporated by reference. Typically, the low $NO_X$ CO combustion promoter compositions comprise (1) an acidic oxide support; (2) an alkali metal and/or alkaline earth metal or mixtures thereof; (3) a transition metal oxide having oxygen storage capability; and (4) palladium. The acidic oxide support preferably contains silica alumina. Ceria is the preferred oxygen storage oxide. Preferably, the oxidative catalyst/additives comprise (1) an acidic metal oxide support containing at least 50 wt % alumina; (2) about 1-10 parts by weight, measured as alkali metal oxide, of at least one alkali metal, alkaline earth metal or mixtures thereof; (3) at least 1 part by weight of $CeO_2$; and (4) about 0.01-5.0 parts by weight of Pd, all of said parts by weight of components (2)-(4) being per 100 parts by weight of said acidic metal oxide support material.

A third class of materials useful as oxidative catalyst/additives in the process of the invention include $NO_x$ reduction compositions as disclosed and described in U.S. Pat. Nos. 6,379,536, 6,280,607 B1, 6,143,167 and 6,129,834, the entire disclosure of these patents being herein incorporated by reference. In general, the $NO_x$ reduction compositions comprise (1) an acidic oxide support; (2) an alkali metal and/or alkaline earth metal or mixtures thereof; (3) a transition metal oxide having oxygen storage capability; and (4) a transition metal selected from the Groups Ib and IIb of the Periodic Table. Preferably, the acidic oxide support contains at least 50 wt % alumina and preferably contains silica alumina. Ceria is the preferred oxygen storage oxide. In a preferred embodiment of the invention, the oxidative catalyst/additives comprise (1) an acidic oxide support containing at least 50 wt % alumina; (2) 1-10 wt %, measured as the metal oxide, of an alkali metal, an alkaline earth metal or mixtures thereof; (3) at least 1 wt % $CeO_2$; and (4) 0.01-5.0 parts wt % of a transition metal, measured as metal oxide, selected from Group Ib of the Periodic Table, all weight percentages of components (2)-(4) being based on the total weight of the acidic oxide support material.

Another class of materials useful as an oxidative catalyst/additive in the invention process include noble metal containing magnesium-aluminum spinel additive compositions as disclosed and described in U.S. Pat. No. 4,790,982, said patent being herein incorporated in its entirety by reference. Generally, compositions in this class comprise at least one metal-containing spinel which includes a first metal and a second metal having a valence higher than the valence of said first metal, at least one component of a third metal other than said first and second metals and at least one component of a fourth metal other than said first, second and third metals, wherein said third metal is selected from the group consisting of Group Ib metals, Group IIb metals, Group VIA metals, the rare earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof. Preferably, the metal containing spinel comprises magnesium as said first metal and aluminum as said second metal, and the atomic ratio of magnesium to aluminum in said spinel is at least about 0.17. The third metal in the spinel preferably comprise a metal of the Platinum Group metals. The third metal component is preferably present in an amount in the range of about 0.001% to about 20% by weight, calculated as elemental third metal, and said fourth metal component is present in an amount in the range of about 0.001% to about 10% by weight, calculated as elemental fourth metal.

Oxidative catalyst/additive compositions used in the process of the invention will typically be in the form of particles and will have a particle size sufficient to permit the compositions to be circulated throughout the catalytic cracking unit simultaneously with the cracking catalyst. Typically the catalyst/additives will have a mean particle size of greater than 45 μm. Preferably, the mean particle size is from about 50 to 200 μm, most preferably about 55 to 150, and even more preferred about 60 to 120 μm. The catalyst/additives have a surface area of at least 5 $m^2$/g, preferably at least 10 $m^2$/g, most preferably at least 30 $m^2$/g, and a Davison Attrition Index (DI) of 50 or less, preferably 20 or less, most preferably, 15 or less.

The oxidative catalyst/additive may be used as separate catalyst/additive particles along with the cracking catalyst or may be incorporated into the cracking catalyst as a component of the catalyst. In a preferred embodiment of the invention, the oxidative catalyst/additives are used as separate particles along with the cracking catalyst inventory to permit optimal conversion of the gas phase reduced nitrogen species to nitrogen while maintaining acceptable product yields of the cracking catalysts.

When used as a separate additive, the oxidative catalyst/additives are used in any amount sufficient to reduce the content of gas phase reduced nitrogen species present in the FCCU regenerator relative to the amount of said nitrogen species present without the use of the catalyst/additives, as measured by conventional gas analysis methodology, including but not limited to, chemiluminescence, UV spectroscopy and IR spectroscopy, and the like. Typically the catalyst/additives are used in an amount of at least 0.01 wt %. Preferably, the catalyst/additives are used in an amount ranging from about 0.01 to about 50 wt %, most preferably from about 0.1 to about 20 wt % of the cracking catalyst inventory. Separate particles of the oxidative catalyst/additive may be added in the conventional manner, e.g. with make-up catalyst to the regenerator or by any other convenient method.

When the oxidative catalyst/additive composition is incorporated into or onto the cracking catalyst as a separate component thereof, the catalyst/additive will typically be used in an amount of at least 0.01 weight percent of the cracking catalyst. Preferably, the catalyst/additive will be used in an amount ranging from about 0.01 to 50 weight percent of the cracking catalyst; most preferably from about 0.1 to about 20 weight percent of the cracking catalyst.

Where the oxidative catalyst/additive compositions have activity to promote CO oxidation under catalytic cracking conditions, either when used as separate additives or being incorporated with the cracking catalyst, the amount of the catalyst/additive compositions used is generally an amount less than the amount necessary to prevent afterburn in the catalytic cracking unit. In a preferred embodiment, the amount of the catalyst/additive composition used is an amount which is 75% less than the amount required to prevent afterburn. In a more preferred embodiment, the amount of the catalyst/additive composition used is an amount which is 50% less than the amount necessary to prevent afterburn.

Where the FCCU regenerator does not have an afterburn problem, that is, the unit does not need to use a CO combustion promoter to prevent afterburn, or where a CO combustion promoter cannot be used in the unit, an oxidative catalyst/additive composition having an activity to promote CO oxidation is used in any amount which (i) does not increase CRC by more than 0.2 absolute %, preferably more than 0.1 absolute %, (ii) does not increase regenerator temperature by more than 50° F., preferably more than 25° F., or (iii) does not decrease afterburn by more than 60° F., preferably more than 30° F.

Other catalytically active components may be present in the circulating inventory of catalytic material in addition to the cracking catalyst and the ammonia removal additive. Examples of such other materials include the octane enhancing catalysts based on zeolite ZSM-5, CO combustion promoters based on a supported noble metal such as platinum, stack gas desulfurization additives such as DESOX® (magnesium aluminum spinel), vanadium traps and bottom cracking additives, such as those described in Sadeghbeigi, op cit and Scherzer, *Octane Enhancing Zeolitic FCC Catalysts*, Marcel Dekker, New York, 1990, ISBN 0-8247-8399-9. These other components may be used in their conventional amounts.

The effect of the present process to minimize the content of gas phase reduced nitrogen species is the reduction of the overall content of $NO_x$ emissions from an FCC process operating in a partial or incomplete burn mode. Very significant reduction in $NO_x$ emissions may be achieved by the use of the present process using the preferred form of the catalyst described above, in some cases up to about 90% relative to the base case using a conventional cracking catalyst, at constant conversion. $NO_x$ reduction of 10 to 90% is readily achievable with the process according to the invention, as shown by the Examples below. However, as will be understood by the one skilled in the catalyst art, the extent of $NO_x$ reduction will depend on such factors as, e.g., the composition and amount of the additive utilized; the design and the manner in which the FCCU is operated, including but not limited to oxygen level and distribution of air in the regenerator, catalyst bed depth in the regenerator, stripper operation and regenerator temperature; the properties of the hydrocarbon feedstock cracked; and the presence of other catalytic additives that may affect the chemistry and operation of the regenerator. Thus, since each FCCU is different in some or all of these respects, the effectiveness of the process of the invention may be expected to vary from unit to unit.

It is further expected that overall $NO_x$ emissions will be advantageously even lower when the process of the invention is used in combination with a CO boiler designed to make the lowest amount of thermal $NO_x$ practical. Typical FCC CO boilers are older technology and are not optimized for minimum thermal $NO_x$ emissions. Upgrades to state-of the art low $NO_x$ designs are not expected to be effective due to the $NO_x$ precursors in the off gas from the partial burn regenerator. Low $NO_x$ burner design approaches and features are described e.g., in appropriate sections in "The John Zink Combustion Handbook", editor, Charles E. Baulkal, Jr., published by the CRC Press, 2001. The formation of $NO_x$ is minimized by avoiding both high temperature and high excess oxygen zones using flame back mixing, exhaust gas recycle to the burner make-up air, staged fuel injection, intense swirl mixing of air and fuel, longer cooler flames, and various combinations of any or all of these design strategies. The present invention enables the benefits of low $NO_x$ burner technology to be realized from an FCC CO boiler so modified, by minimizing the reduced nitrogen species available to be oxidized therein to $NO_x$. The result is a new low $NO_x$ partial burn FCC system that can eliminate the need for capital and operating cost-intensive systems like SCR, SNCR, scrubbers, and other approaches known in the art.

The scope of the invention is not in any way intended to be limited by the examples set forth below. The examples include the preparation of oxidative additives useful in the process of the invention and the evaluation of the invention process to reduce $NO_x$ and gas phase reduced nitrogen species in a catalytic cracking environment.

To further illustrate the present invention and the advantages thereof, the following specific examples are given. The examples are given as specific illustrations of the invention. It should be understood, however, that the invention is not limited to the specific details set forth in the examples.

All parts and percentages in the examples as well as the remainder of the specification referring to solid material composition or concentration are by weight unless otherwise specified. However, all parts and percentages in the examples as well as the remainder of the specification referring to gas composition are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The efficiency of the process of the invention for converting gas phase reduced nitrogen species released from an FCCU regenerator operating in a partial or incomplete burn mode to molecular nitrogen was evaluated in the Examples using a Regenerator Test Unit (RTU) and model reactions. The RTU is an apparatus specifically designed to simulate the operation of an FCCU regenerator. The RTU is described in detail in G. Yaluris and A. W. Peters "Studying the Chemistry of the FCCU Regenerator Under Realistic Conditions," Designing Transportation Fuels for a Cleaner Environment, J. G. Reynolds and M. R. Khan, eds., p. 151, Taylor & Francis, 1999, ISBN: 1-56032-813-4 which description is herein incorporated by reference.

The model reaction in the RTU for determining the efficiency of the invention process for converting gas phase reduced nitrogen species without converting the species to $NO_x$ was the reaction of $NH_3$ over a cracking catalyst inventory containing the additive tested in the presence of CO and various amounts Of $O_2$. In this experiment $NH_3$ represents the gas phase reduced nitrogen species, and CO and $O_2$ represent the other reductants and oxidizers typically found in a FCC unit regenerator operating in partial burn. As the $O_2$ level in the reactor changes, the various reducing/oxidizing conditions that can be encountered from regenerator to regenerator or inside the same regenerator can be simulated. The key measurement in this experiment in addition to $NH_3$ conversion, is how much of the $NH_3$ is converted to $NO_x$ if any. It is desirable that the latter conversion is as low as possible for a wide range of $O_2$ amounts in the reactor.

The efficiency of the process of the invention to convert $NO_x$ after it is formed in a FCCU regenerator operating in partial burn was determined in the RTU by measuring the activity of an additive to reduce $NO_x$ with CO, a common reductant in every FCCU regenerator. The key performance measurement in this test is the $NO_x$ conversion. It is desirable to have high $NO_x$ conversion to nitrogen for a wide range of $O_2$ amounts.

Gas phase reduced nitrogen species are a reductant for reducing $NO_x$ after it is formed. The ability of an additive to catalyze this reaction while simultaneously converting the reduced nitrogen species to molecular nitrogen was determined by measuring in the RTU its activity for converting $NH_3$ with $NO_x$ under various $O_2$ levels simulating the reducing/oxidizing conditions possible in a regenerator operating in partial burn. It is desirable in this experiment to have high $NO_x$ conversion to nitrogen.

Example 1

A microspheriodal particulate support material having the following analysis: 2.3% total volatiles, and approximately 4.5% $SiO_2$, 5% $Na_2O$, 16.8% $CeO_2$, and 73% $Al_2O_3$, and BET surface area of 140 m$^2$/g was prepared as a base material for the preparation of a $NO_x$ composition of the invention. A slurry was prepared from an aqueous alumina slurry having 20% solids of a peptizable alumina (Versal 700 alumina powder, obtained from La Roche Industries Inc., 99% $Al_2O_3$, 30% moisture). The alumina slurry was prepared using 31.6 lbs of the alumina powder. To the alumina slurry 3.87 lbs of an aqueous sodium hydroxide solution (50% NaOH) was added. Next, 10.4 lbs of cerium carbonate crystals (obtained from Rhone Poulenc, Inc., 96% $CeO_2$, 4% $La_2O_3$, 50% moisture) was added to the slurry. The slurry was diluted with a sufficient amount of water to bring the solids concentration of the slurry to 12%. Finally, 3.38 lbs of ion exchanged silica sol of Nalco 1140 (obtained from Nalco Chemicals Co.) was added to the slurry. The mixture was agitated to assure good mixing and then milled in a stirred media mill to reduce agglomerates to substantially less than 10 µm. The milled mixture was then spray dried to form approximately 70 μm microspheres and thereafter calcined at approximately 650° C. to remove volatiles.

Example 2

An Additive A was prepared using the base material prepared in Example 1. 80 g of the base material was placed in an inclined beaker on a mechanical rotator. A platinum impregnation solution was prepared by weighing out 0.1715 g of a platinum tetramine dihydroxide aqueous solution containing 22.79% platinum and diluting with DI water to 100 g total. The base material was then impregnated by gradually spraying with 50 g of the dilute Pt solution through an air mist spray nozzle system. The wet impregnated base material was dried in an oven at 120° C. over night. The dried cake was in the form of large chunks and was first ground in a blender and screened before calcining at 650° C. for two hours to decompose the nitrates and remove volatiles. The resulting material contained: 72.5% $Al_2O_3$, 4.4% $SiO_2$, 5% $Na_2O$, 18.8% $CeO_2$, 331 ppm Pt, and had a BET surface area of 135 $m^2/g$ and a mean particle size of 58 μm.

Example 3

An Additive B was prepared as described in Example 2 with the exception that the platinum impregnation solution prepared was diluted with DI water to 50 g total and the base material was then impregnated by gradually spraying with all of the latter dilute Pt solution through an air mist spray nozzle system. The resulting material contained: 72.8% $Al_2O_3$, 4.4% $SiO_2$, 5.1% $Na_2O$, 17% $CeO_2$, 688 ppm Pt, and had a BET surface area of 141 $m^2/g$ and a mean particle size of 58 μm.

Example 4

An Additive C was prepared in accordance with U.S. Pat. No. 6,358,881 B1. The additive had the following analyses: 5.8% total volatiles, and approximately $SiO_2$ 4.9%, $Na_2O$ 4.9%, $CeO_2$ 21.2%, $Al_2O_3$ 68.7%, 970 ppm Pd, and BET surface area of 167 $m^2/g$ and a mean particle size of 90 μm.

Example 5

The efficiency of Additives A, B and C, prepared in Examples 2, 3, and 4 respectively, to remove gas phase reduced nitrogen species other than $N_2$ from an FCCU regenerator operating in partial burn was compared at various oxygen levels with that of a cracking catalyst alone and a commercial platinum-containing combustion promoter, CP-3® (platinum on alumina) sold by Grace Davison, Columbia, Md.

The experiments were conducted by calcining the additives for 2 hrs at 595° C. Following calcination, the additives were blended at 0.5% level with FCC catalyst which had been deactivated for 4 hrs at 816° C. in a fluidized bed reactor with 100% steam. The cracking catalyst alone or blended with an additive was then fed to the RTU reactor operating at 700° C. The gas feed to the reactor was a mixture of $NH_3$ and CO containing 5000 to 5500 ppm CO, approximately 600 ppm $NH_3$ various amounts of $O_2$ added as 4% $O_2$ in $N_2$, and the balance $N_2$. The total gas feed rate excluding the $O_2$ containing gas feed was 1000-1100 sccm. The platinum on alumina CO combustion promoter, CP-3®, was tested at 0.25% additive level. Results are recorded in FIG. 1 and FIG. 2.

Figure 2:
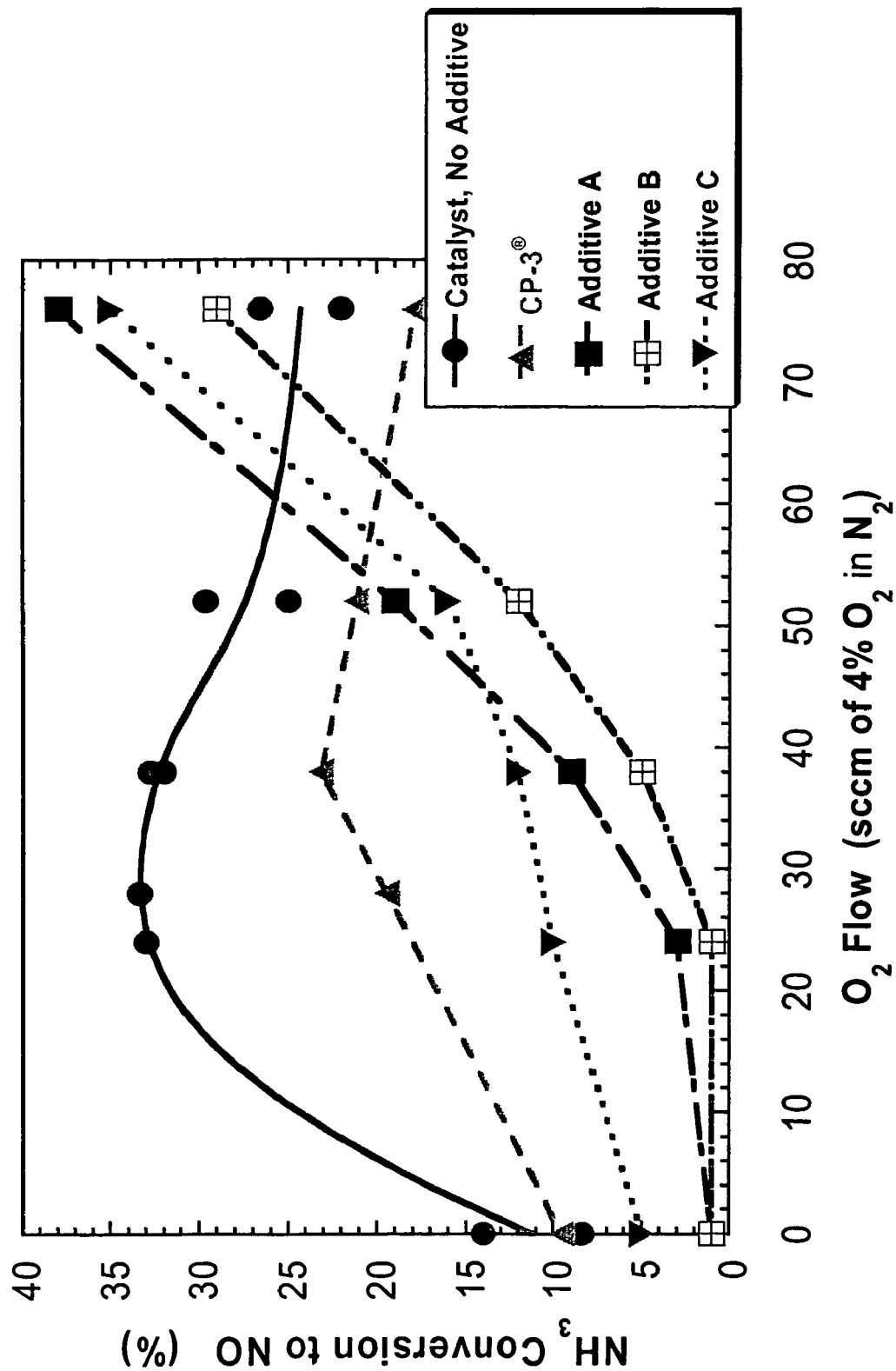
FIG. 2 is a graphic representation of the comparison of ammonia conversion to $NO_x$ in an RTU where ammonia reacts with CO at various levels of oxygen in a reactor feed in the presence of the Additives A, B and C, the FCC catalyst alone, and a commercial combustion promoter, CP-3®.

FIG. 1 shows that at low levels of oxygen, which simulates partial burn, the platinum and palladium containing additives, Additives A, B, and C, were highly effective in reducing ammonia when compared to the activity of the cracking catalyst alone or the platinum-containing combustion promoter, CP-3®. Further, FIG. 2 shows that under partial burn conditions the additives exhibited increased activity to reduce the ammonia to molecular nitrogen thereby preventing the conversion of the ammonia to $NO_x$. No other nitrogen oxides, e.g., $NO_2$ or $N_2O$ were detected, indicating the conversion of $NH_3$ to molecular nitrogen.

Example 6

The activity of Additives A, B and C, prepared in Examples 2, 3 and 4, respectively, for reducing $NO_x$ emissions from an FCCU regenerator operating in partial burn mode by reacting $NH_3$ with $NO_x$ at various levels of oxygen was compared to that of the cracking catalyst alone and a commercial platinum-containing combustion promoter, CP-3®.

The experiment was conducted as in Example 5 except that the gas mixture fed to the reactor contained approximately 1000 ppm $NH_3$ and 500-550 ppm $NO_x$ as well as various amounts of oxygen with the balance $N_2$. Results were recorded in FIG. 3 and FIG. 4.

Figure 3:
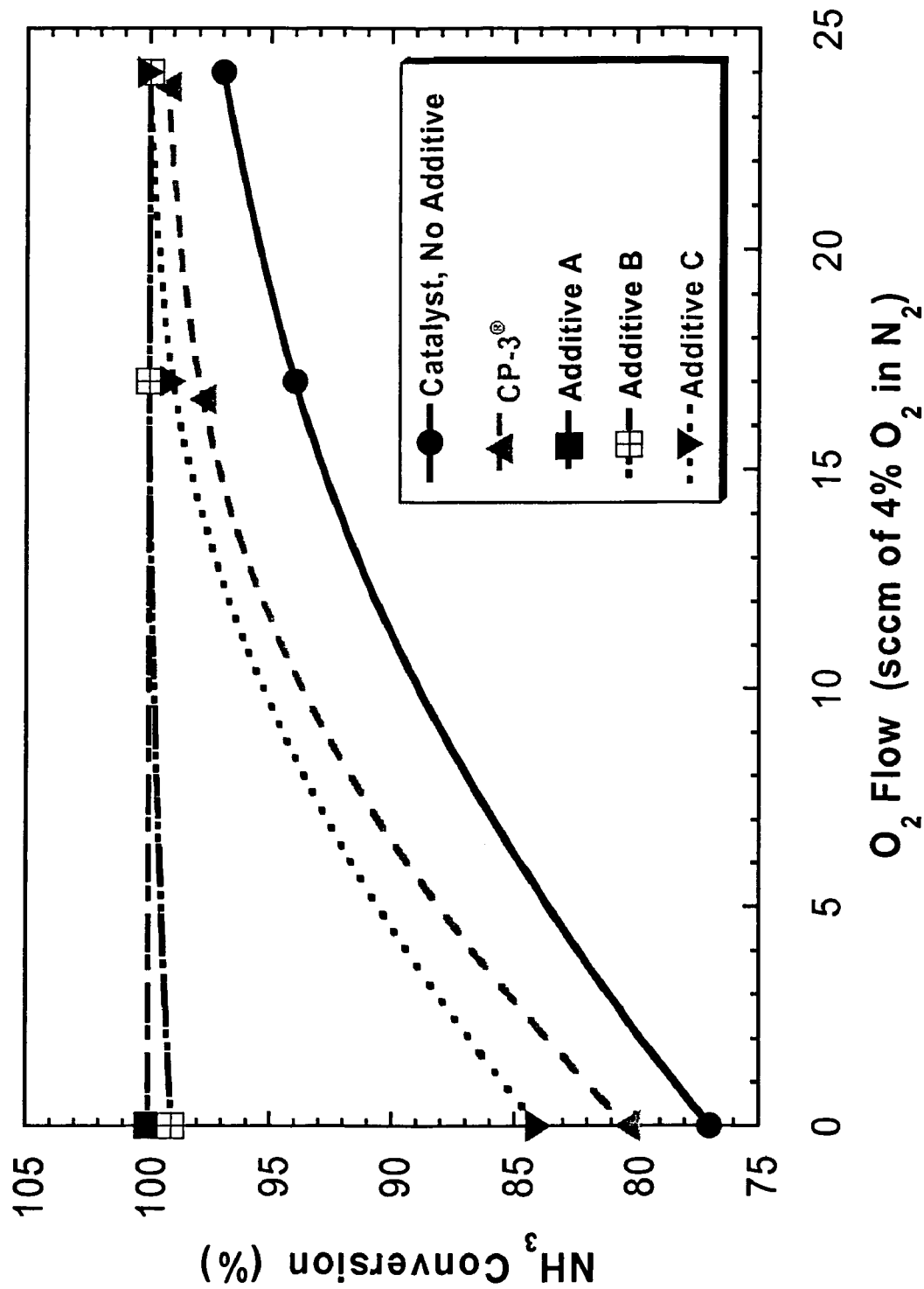
FIG. 3 is a graphic representation of the comparison of ammonia conversion in an RTU where ammonia reacts with NO at various levels of $O_2$ in a reactor feed in the presence of Additives A, B and C, the FCC catalyst alone, and a commercial combustion promoter, CP-3®.
Figure 4:
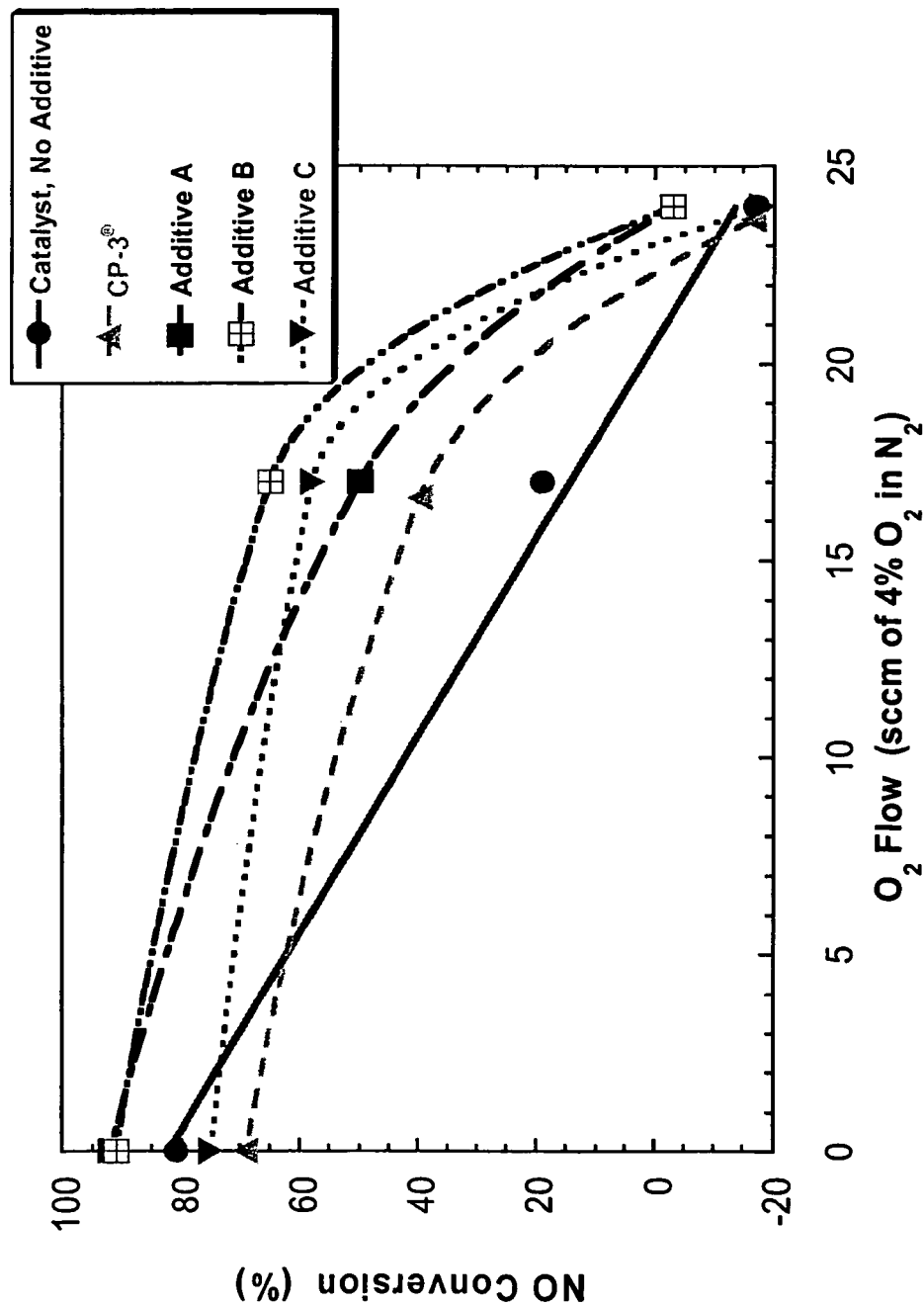
FIG. 4 is a graphic representation of the comparison of $NO_x$ conversion in an RTU where ammonia reacts with NO at various levels of $O_2$ in a reactor feed in the presence of Additives A, B and C, the FCC catalyst alone, and a commercial combustion promoter, CP-3®.

At the high temperatures $NH_3$ reacts with $O_2$ to form $N_2$ or $NO_x$. $NH_3$ can also react in the gas phase with $NO_x$ in a non-catalytic process that is often used for $NO_x$ abatement. However, the data in FIG. 3 and FIG. 4 show, that in accordance with the process of the invention, Additives A, B, and to a lesser extent, C showed enhanced conversion of ammonia and $NO_x$ to molecular nitrogen at low oxygen levels. No other nitrogen oxides, e.g., $NO_2$ or $N_2O$ were detected, indicating the conversion of $NH_3$ to molecular nitrogen.

Example 7

The activity of Additives A, B and C to decrease $NO_x$ after it is formed in an FCC unit regenerator operating in partial burn was compared to the activity of the cracking catalyst alone and a commercial platinum-containing combustion promoter, CP-3®, by measuring the activity of the catalyst and additives to convert $NO_x$ to $N_2$ in the presence of CO at various oxygen levels.

The experiments were conducted in the RTU described in Examples 5 and 6 with the exception that the gas feed to the RTU reactor was a mixture containing 500-550 ppm NO and 5000-5500 ppm CO, at various amounts of $O_2$ and the balance $N_2$. Results are recorded in FIG. 5.

Figure 5:
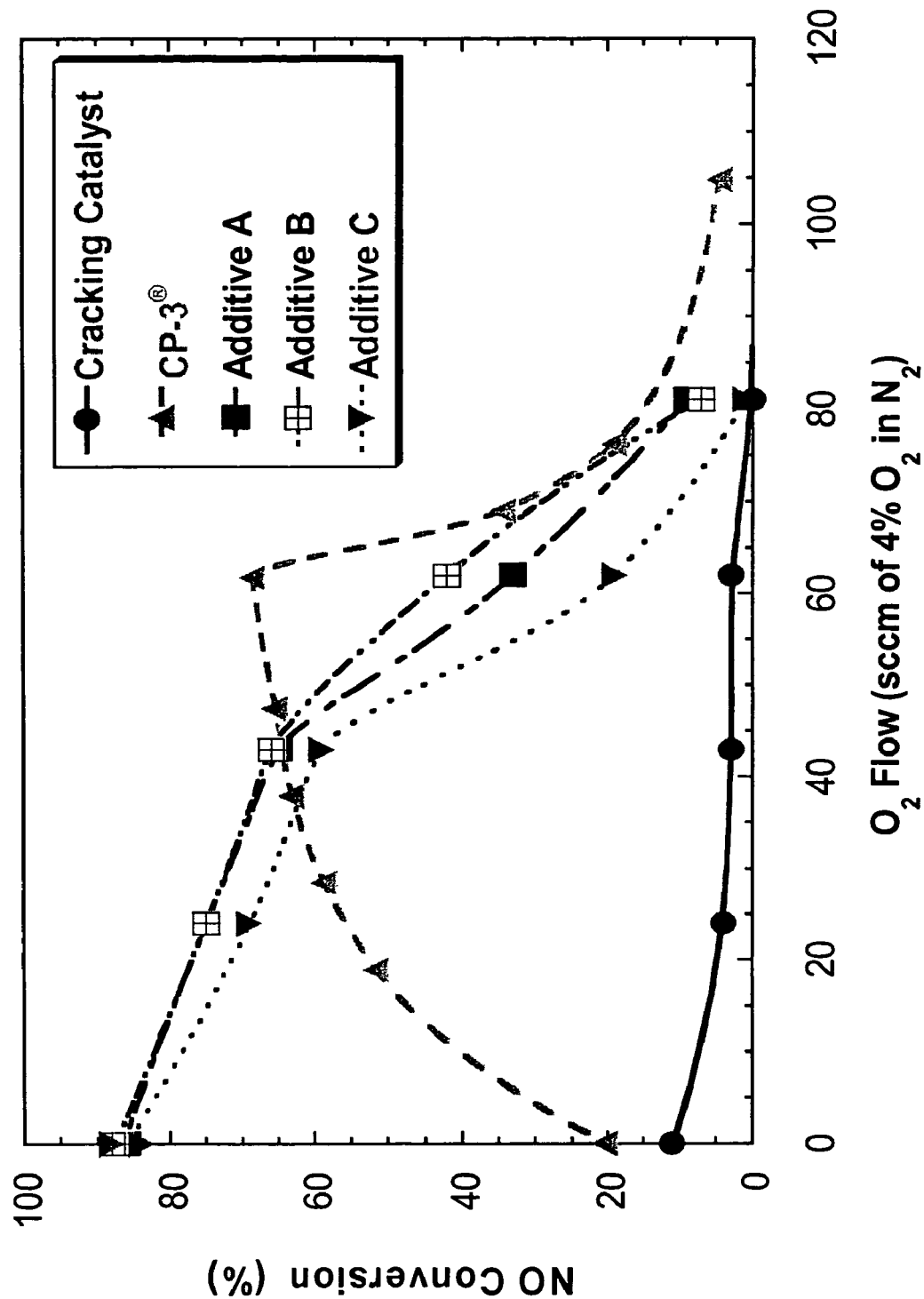
FIG. 5 is a graphic representation of the comparison of $NO_x$ conversion to molecular nitrogen in an RTU where NO reacts with CO at various levels of $O_2$ in a reactor feed in the presence of Additives A, B and C, the FCC catalyst alone, and a commercial combustion promoter, CP-3®.

FIG. 5 shows that at low oxygen levels simulating partial burn, the Additives A, B and C are more effective than catalyst alone or the platinum based combustion promoter, CP-3®, in removing $NO_x$.

Example 8

The activity of the Additive C for removal of HCN from an FCCU regenerator was compared to the activity of the cracking catalyst alone and a commercial platinum-containing combustion promoter, CP®-5 (platinum on alumina) sold by Grace Davison, a business unit of W.R. Grace & Co.-Conn., Columbia, Md.

The cracking catalyst was deactivated for 4 hrs at 816° C. in a fluidized bed reactor with 100% steam, and coked in a DCR. The description of the DCR is described in detail in the G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis Volume 76, p.

257, Elsevier Science Publishers B.V., Amsterdam 1993, ISBN 0-444-89037-8, said reference being herein incorporated by reference.

After being coked in the DCR the catalyst had about 1.2-1.5 wt % coke. About 20 g of the coked cracking catalyst alone or with the Additive C or the combustion promoter added at 0.5 wt % was loaded in the RTU. The gas flow to the RTU reactor was about 800 sccm, containing about 5% $O_2$ with the balance $N_2$. Following an experimental procedure commonly known to those skilled in the art as Temperature-Programmed Oxidation or TPO, and starting from room temperature, the reactor was heated up to about 780° C. by raising the temperature at a rate of about 9° C./min, while continuously flowing the aforementioned gas into the RTU reactor. During this experiment the carbon, hydrogen, nitrogen and sulfur containing coke species were gradually burnt releasing $CO_2$, CO, $SO_2$, reduced nitrogen species like HCN, NO and some $N_2O$. By integrating the detector signal over the duration of the TPO experiment we were able to measure the amount of the various gas phase species made. The results are recorded in Table 1 below:

TABLE 1

Integrated amount of species detected in the RTU reactor effluent (a.u.)

| Species | Cracking Catalyst | CP ®-5 | Additive C |
|---|---|---|---|
| HCN | 29066 | 8475 | 7038 |
| NO | 3966 | 36165 | 24476 |
| $N_2O$ | 3583 | | |

Example 9

A support material was prepared as in Example 1, except that the inputs were adjusted to obtain a final additive composition as recited in Table 2 below. Additive D was prepared by placing 200.0 g of this support material in an inclined beaker on a mechanical rotator. A Rh impregnating solution was prepared by diluting 0.25 g of 10% Rh from nitrate salt with 200.0 g DI water. The support material was then impregnated gradually with all 200.0 g of the dilute Rh solution by spraying through a hand-held eye dropper. The wet impregnated material was dried in an oven at 120° C. over night. The dried cake was in the form of large chunks and was ground and screened to obtain particles having an average particle size of 68 µm. The ground material was then calcined at 650° C. for two hours to decompose the nitrates and remove volatiles. The resulting material has the composition shown in Table 2 below.

TABLE 2

Composition of Additive D

| | | Additive D |
|---|---|---|
| $SiO_2$ | wt. % | 9.04 |
| $Al_2O_3$ | wt. % | 66.4 |
| $La_2O_3$ | wt. % | 0.017 |
| $CeO_2$ | wt. % | 21.3 |
| $Na_2O$ | wt. % | 4.97 |
| Rh | ppm | 118 |
| APS | microns | 68 |
| SA | $m^2/g$ | 140 |

Example 10

Figure 6:
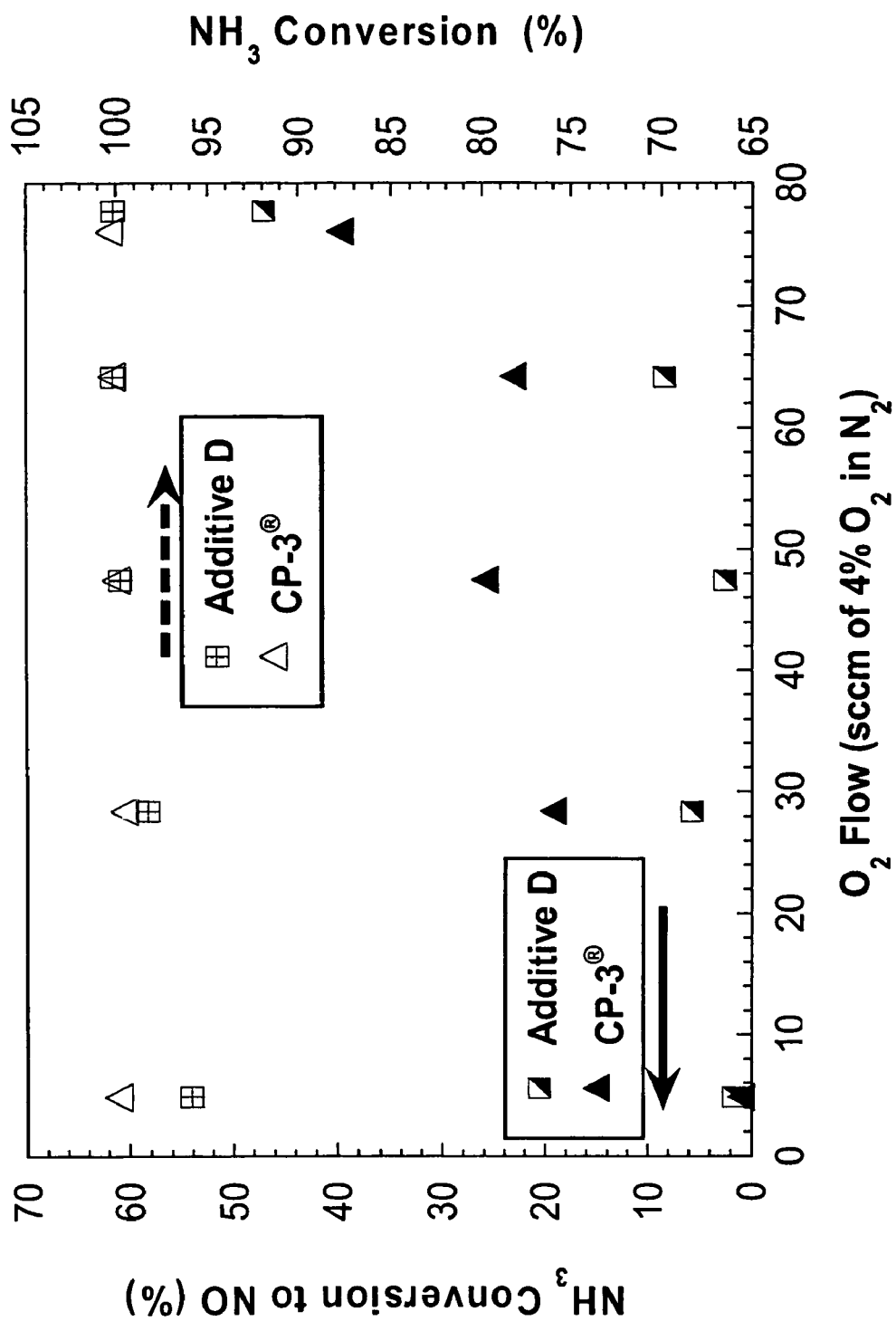
FIG. 6 is a graphic representation of the comparison of total ammonia conversion and ammonia conversion to $NO_x$ in an RTU where ammonia reacts with CO at various levels of oxygen in a reactor feed in the presence of Additive D and CP-3®.
Figure 7:
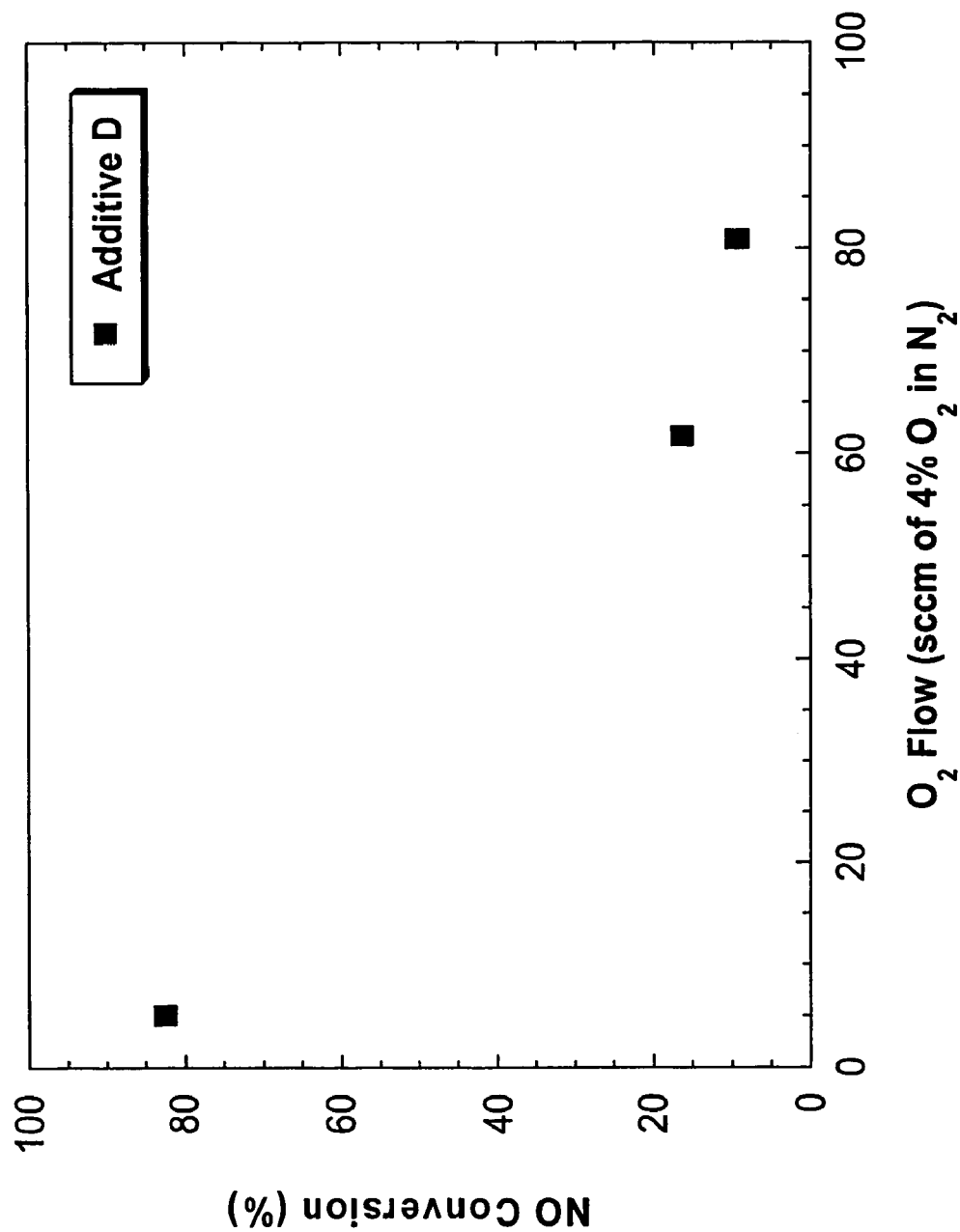
FIG. 7 is a graphic representation of the comparison of $NO_x$ conversion to molecular nitrogen in an RTU where NO reacts with CO at various levels of $O_2$ in a reactor feed in the presence of Additive D.

The efficiency of Additive D to remove gas phase reduced nitrogen species other than $N_2$ from an FCCU regenerator operating in partial burn was compared at various oxygen levels with that of a commercial platinum-containing combustion promoter, CP-3®, using the testing procedures as described in Examples 5 and 7. The results of these experiments are shown in FIGS. 6 and 7, and demonstrate that Additive D is highly effective in reducing $NH_3$ or $NO_x$ to $N_2$. FIG. 6 further demonstrates that Additive D is more effective than a conventional CO combustion promoter such as CP-3® in converting ammonia to $N_2$.

Example 11

The CO oxidation activity of Additives A, B and C was assessed in the RTU using cracking catalyst coked in the Davison Circulating Riser (DCR). The FCC catalyst, OCTA-CAT®-DST obtained from Grace Davison, Columbia, Md., was first deactivated for 4 hours at 816° C. in a fluidized bed reactor with 100% steam before being coked by being circulated in the DCR to react with a FCC feed. The properties of the coked catalyst are shown in Table 3 below. The additives were calcined for 2 hours at 593° C. and then mixed with the coked cracking catalyst at 0.2 wt. % additive level (Additive D) or 0.1 wt. % additive level (CP-3®). The coke catalyst or the blend was then fed into the RTU reactor operating at 700 or 710° C. respectively, and the coke was burnt with a gas mixture of air and nitrogen so that there was 1.1% excess $O_2$ in the RTU reactor effluent. The CO measured at the reactor effluent is a measure of the CO combustion activity under catalytic cracking conditions. The lower the CO the higher the CO combustion activity of the additive. The results of the CO emissions measured in the RTU reactor effluent are recorded in Table 4. The results show that while Additive D is active for converting CO, even when used at twice the amount of the conventional CO promoter, Additive D is not effective as a CO combustion promoter.

TABLE 3

Properties of coked catalyst used in Example 11.

| $SiO_2$ | wt. % | 53.4 |
|---|---|---|
| $Al_2O_3$ | wt. % | 43.7 |
| $RE_2O_3$ | wt. % | 0.10 |
| $Na_2O$ | wt. % | 0.33 |
| $SO_4$ | wt. % | 0.56 |
| $Fe_2O_3$ | wt. % | 0.7 |
| $TiO_2$ | wt. % | 1.0 |
| Carcon | wt. % | 1.37 |
| S | wt. % | 0.16 |
| Surface Area | $m^2/g$ | 168 |

TABLE 4

CO emissions during coked FCC catalyst regeneration in the RTU with Additive D and CP-3 ® blended in with the coked catalyst.

| Additive | Amount (wt. %) | Bed Temperature (C.) | CO (nppm) |
|---|---|---|---|
| None | | 701 | 3478 |
| CP-3 | 0.1 | 700 | 1061 |
| Additive D | 0.2 | 701 | 2634 |
| None | | 711 | 1991 |
| CP-3 | 0.1 | 710 | 782 |
| Additive D | 0.2 | 711 | 1850 |

What is claimed is:

1. A process for reducing the content of gas phase reduced nitrogen species in the off gas derived from a regeneration zone of a fluid catalytic cracking unit (FCCU), said process comprising (a) circulating an inventory of catalytic cracking catalyst and a gas phase reduced nitrogen species oxidation catalyst/additive composition throughout an FCCU having a regeneration zone operated under a partial combustion mode or an incomplete combustion mode and having a dilute phase, during a fluid catalytic cracking process, wherein gas phase reduced nitrogen species are contained in an off gas released from the FCCU regeneration zone, and wherein the oxidative catalyst/additive composition has the ability to oxidize CO under fluid catalytic cracking conditions and simultaneously oxidize gas phase reduced nitrogen species in the off gas to molecular nitrogen under partial or incomplete burn catalytic cracking conditions, the FCCU regeneration zone being capable of afterburn in the dilute phase, said oxidative catalyst/additive composition being used in an amount which is at least 0.01 wt % of the cracking catalyst inventory and which is less than an amount sufficient to prevent afterburn in the dilute phase of the FCCU, and said oxidative catalyst/additive composition having a mean particle size of about 50 to about 200 µm, (b) contacting in the FCCU regeneration zone the gas phase reduced nitrogen species with the gas phase reduced nitrogen species oxidative catalyst/additive composition; and (c) reducing the content of gas phase reduced nitrogen species in the FCCU regeneration zone off gas relative to the content of gas phase reduced nitrogen species in the off gas absent the presence of the oxidative catalyst/additive composition.

2. The process of claim 1 wherein the residence time of the oxidative catalyst/additive composition in the regeneration zone of the FCCU relative to that of the cracking catalyst inventory is substantially the same.

3. The process of claim 2 wherein the residence time of the oxidative catalyst/additive composition in the regeneration zone of the FCCU relative to that of the cracking catalyst inventory is the same.

4. The process of claim 1 wherein the oxidative catalyst/additive composition has a mean particle size ranging from about 55 to about 150 µm.

5. The process of claim 1 wherein the amount less than the amount sufficient to prevent afterburn in the dilute phase is an amount which is 75% less than the amount sufficient to prevent afterburn.

6. The process of claim 5, wherein the amount less than the amount sufficient to prevent afterburn in the dilute phase is an amount which is 50% less than the amount sufficient to prevent afterburn.

7. The process of claim 1 wherein the amount of the oxidative catalyst/additive composition ranges from about 0.1 to about 50 wt % of the cracking catalyst inventory.

8. The process of claim 1 further comprising passing said regeneration zone off gas having a reduced content of gas phase reduced nitrogen species to a CO boiler and releasing an off gas having a reduced content of $NO_x$ emissions into the atmosphere.

9. The process of claim 8 wherein the CO boiler is a low $NO_x$ CO boiler.

10. The process of claim 1 wherein the gas phase reduced nitrogen species comprise ammonia.

11. The process of claim 1 wherein the gas phase reduced nitrogen species comprise hydrogen cyanide.

12. A process for reducing the content of gas phase reduced nitrogen species in the off gas derived from a regeneration zone of a fluid catalytic cracking unit (FCCU), said process comprising (a) contacting an off gas containing gas phase reduced nitrogen species released from a regenerator of an FCCU, said regenerator having a dilute phase and being operated in a partial burn or incomplete combustion mode, in the presence of an inventory of catalytic cracking catalyst, with a gas phase reduced nitrogen species oxidative catalyst/additive composition having the ability to oxidize CO and simultaneously oxidize the gas phase reduced nitrogen species in the off gas to molecular nitrogen under catalytic cracking conditions, wherein said oxidative catalyst/additive composition is used in an amount which ranges from about 0.01 to about 50 wt % of the cracking catalyst inventory and which does not increase coke left on the catalyst (CRC) by more than 0.2 absolute %, said oxidative catalyst/additive composition being circulated throughout the FCCU along with the cracking catalyst inventory, wherein the oxidative catalyst/additive composition has a particle size ranging from about 50 to about 200 µm; and (b) reducing the content of gas phase reduced nitrogen species in the FCCU regeneration zone off gas relative to the content of gas phase reduced nitrogen species in the off gas absent the presence of the oxidative catalyst/additive composition.

13. The process of claim 12 wherein the oxidative catalyst/additive composition is circulated throughout the FCCU simultaneously with the cracking catalyst inventory.

14. The process of claim 12 wherein the residence time of the oxidative catalyst/additive composition in the FCCU regenerator relative to that of the cracking catalyst inventory is substantially the same.

15. The process of claim 12 wherein the residence time of the oxidative catalyst/additive composition in the FCCU regenerator relative to that of the cracking catalyst inventory is the same.

16. The process of claim 12 wherein the oxidative catalyst/additive composition has a particle size ranging from about 55 to about 150 µm.

17. The process of claim 12 further comprising passing said regeneration zone off gas having a reduced content of gas phase reduced nitrogen species to a CO boiler and releasing an off gas having a reduced content of $NO_x$ into the atmosphere.

18. The process of claim 17 wherein the CO boiler is a low $NO_x$ CO boiler.

19. The process of claim 12 wherein the gas phase reduced nitrogen species comprise ammonia.

20. The process of claim 12 wherein the gas phase reduced nitrogen species comprises hydrogen cyanide.

21. The process of claim 12 wherein the amount of said oxidative catalyst/additive composition does not increase CRC by more than 0.1 absolute %.

22. A process of reducing $NO_x$ emissions during catalytic cracking of hydrocarbon feedstocks into lower molecular weight components, said method comprising (a) contacting an inventory of catalytic cracking catalyst circulating in a catalytic cracking unit having a hydrocarbon cracking zone and a catalyst regeneration zone operated in a partial or incomplete mode of combustion with a gas phase reduced nitrogen species oxidative catalyst/additive, wherein said catalyst regeneration zone has a dilute phase and is capable of afterburn, said oxidative catalyst/additive composition having the ability to oxidize gas phase reduced nitrogen species in the off gas to molecular nitrogen and simultaneously the ability to oxidize CO, and having a mean particle size of about 50 to about 200 µm, and said oxidative catalyst/additive composition being used in an amount which ranges from about 0.01 to about 50 wt % of the catalytic cracking catalyst inventory and which is less than an amount sufficient to prevent afterburn in the dilute phase of the catalyst regeneration zone, (b) circulating the cracking catalyst inventory and oxidative catalyst/additive composition throughout the catalytic cracking unit between the hydrocarbon cracking zone and the catalyst regeneration zone to contact a regeneration zone off gas containing gas phase reduced nitrogen species; (c) reducing the content of gas phase reduced nitrogen species in the off gas relative to the content of gas phase reduced nitrogen species present in the regeneration zone off gas without the oxidative catalyst/additive composition, (d) providing a CO boiler downstream of said regeneration zone, said CO boiler being operated in a manner effective to oxidize the regeneration zone off gas; (e) passing the off gas having a reduced content of gas phase reduced nitrogen species to the CO boiler and (f) releasing from the CO boiler an off gas having a reduced $NO_x$ content into the atmosphere.

23. The process of claim 22 wherein said regeneration zone off gas is passed to a separations means wherein said cracking catalyst and oxidative catalyst/additive composition are separated prior to passage to the CO boiler.

24. The process of claim 22 wherein the residence time of the oxidative catalyst/additive composition in the regeneration zone relative to the residence time of the cracking catalyst inventory in the regeneration zone is substantially the same.

25. The process of claim 22 wherein the residence time of the oxidative catalyst/additive composition in the regeneration zone relative to the residence time of the cracking catalyst in the regeneration zone is the same.

26. The process of claim 22 wherein the oxidative catalyst/additive composition has a mean particle size of about 55 to about 150 μm.

27. The process of claim 22 wherein the catalytic cracking process is a fluid catalytic cracking process.

28. The process of claim 22 wherein the gas phase reduced nitrogen species comprise ammonia.

29. The process of claim 22 wherein the gas phase reduced nitrogen species comprise hydrogen cyanide.

30. The process of claim 22 or 23 wherein the CO boiler is a low $NO_x$ CO boiler.

31. The process of claim 22 wherein the amount less than the amount sufficient to prevent afterburn is an amount which is 75% less than the amount sufficient to prevent afterburn.

32. The process of claim 22 wherein the amount less than the amount sufficient to prevent afterburn is an amount which is 50% less than the amount sufficient to prevent afterburn.

33. The process of claim 22 wherein the amount of said oxidative catalyst/additive composition used is an amount which does not increase CRC by more than 0.2 absolute %.

34. The process of claims 1, 12 or 22 wherein the gas phase reduced nitrogen species oxidative catalyst/additive is an additive particle separate from the catalytic cracking catalyst.

35. The process of claims 1, 12, or 22 wherein the gas phase reduced nitrogen species oxidative catalyst/additive is integrated into the catalytic cracking catalyst as a component thereof.

36. The process of claims 1, 12 or 22 wherein the amount of said oxidative catalyst/additive composition does not increase the regenerator temperature by more than 50° F.

37. The process of claims 1, 12 or 22 wherein the amount of said oxidative catalyst/additive composition does not decrease afterburn by more than 60° F.

* * * * *